US008864125B2

(12) United States Patent
Mizuno

(10) Patent No.: US 8,864,125 B2
(45) Date of Patent: Oct. 21, 2014

(54) SHEET FEED DEVICE AND IMAGE FORMING APPARATUS

(71) Applicant: Canon Kabushiki Kaisha, Tokyo (JP)

(72) Inventor: Tomoyasu Mizuno, Mishima (JP)

(73) Assignee: Canon Kabusiki Kaiska, Tokyo (JP)

( * ) Notice: Subject to any disclaimer, the term of this patent is extended or adjusted under 35 U.S.C. 154(b) by 0 days.

(21) Appl. No.: 13/788,094

(22) Filed: Mar. 7, 2013

(65) Prior Publication Data

US 2013/0256980 A1 Oct. 3, 2013

(30) Foreign Application Priority Data

Mar. 29, 2012 (JP) ................................. 2012-077803

(51) Int. Cl.
*B65H 1/08* (2006.01)
*G06F 15/00* (2006.01)

(52) U.S. Cl.
USPC .......................................... 271/145; 358/1.12

(58) Field of Classification Search
USPC ................. 271/145; 358/1.11–1.14, 1.18, 1.5
See application file for complete search history.

(56) References Cited

U.S. PATENT DOCUMENTS 6,769,681 B2 8/2004 Nakamura et al.
6,947,679 B2 9/2005 Kato et al.
7,980,556 B2 7/2011 Mizuno
8,054,475 B2 * 11/2011 Takahashi .................... 358/1.12
2003/0047864 A1 3/2003 Nakamura et al.
2012/0001380 A1 * 1/2012 Hayama ........................ 271/145

FOREIGN PATENT DOCUMENTS

JP 2003-081446 A 3/2003
JP 2006-326861 A 12/2006
JP 2007-160711 A 6/2007
JP 2008-080799 A 4/2008
JP 2010-078676 A 4/2010

* cited by examiner

*Primary Examiner* — Patrick Cicchino

(74) *Attorney, Agent, or Firm* — Fitzpatrick, Cella, Harper & Scinto

(57) ABSTRACT

A sheet feed device includes a second detection unit which detects a state of a detection switch unit whose state is switched due to the change of state of the sheet feed device; a signal conversion unit which converts a detection signal obtained in accordance with a state of the detection switch unit into a serial signal; a communication line which connects a first detection unit of an image forming device to the second detection unit; and a signal line configured to connect the first detection unit to the signal conversion unit. When the sheet feed device is in a first state, the first detection unit receives information indicating the state detected by the second detection unit via the communication line, and thereby detects the change of state of the sheet feed device.

10 Claims, 10 Drawing Sheets

FIG. 6

| PAPER SIZE | 130a | 131a | 132a |
|---|---|---|---|
| OPEN | 0 | 0 | 0 |
| A4 | 0 | 0 | 1 |
| A5 | 0 | 1 | 0 |
| Legal | 0 | 1 | 1 |
| Letter | 1 | 0 | 0 |
| Executive | 1 | 0 | 1 |
| Universal | 1 | 1 | 0 |
| B5 | 1 | 1 | 1 |

| STATE OF PAPER STACK CASSETTE | 130a, 131a, 132a | SIGNAL LINE 211 VOLTAGE LEVEL |
|---|---|---|
| OPEN | ALL ARE "0" | Low |
| CLOSED | AT LEAST ONE IS "1" | High |

SHEET FEED DEVICE AND IMAGE FORMING APPARATUS

BACKGROUND OF THE INVENTION

1. Field of the Invention

The present invention relates to sheet feed devices and image forming apparatuses, and more particularly to detection of a state of a paper stack cassette in a sheet feed device.

2. Description of the Related Art

An image forming apparatus is connected to various optional units, such as a sheet feed device, to extend functions thereof. The image forming apparatus needs to confirm a state of the sheet feed device to perform a feed operation or a conveyance operation, and one type of such confirmation is confirmation of an open/closed state of a paper stack cassette. Also, detection of the open/closed state of the paper stack cassette can be used in transition from a sleep state to a standby state, and it is therefore also sought from the viewpoint of usability that the open/closed state of the paper stack cassette is detected during an energy saving mode.

In a conventional connection between an image forming apparatus and a sheet feed device, a controller of the image forming apparatus can be connected to a controller of the sheet feed device via a communication line. The image forming apparatus transmits and receives information regarding the sheet feed device through the communication line, and this information includes information regarding the open/closed state of a paper stack cassette, and the like (see Japanese Patent Laid-Open No. 2008-080799). Also, for detection of the open/closed state of the paper stack cassette, a configuration is available in which detection of the paper size of recording materials contained in the paper stack cassette and detection of the open/closed state of the paper stack cassette are recognized based on the on/off combination of a plurality of detection switches. This is an inexpensive configuration in which the number of the detection switches is reduced, compared with a configuration in which a switch dedicated to the open/closed state of the paper stack cassette is provided (e.g., see Japanese Patent Laid-Open No. 2003-081446).

FIG. 10 shows a diagram of control system blocks for detecting an open/closed state of the paper stack cassettes by a conventional method. An image forming apparatus 100 includes a first detection unit 200, and sheet feed devices 150*a* and 150*b* include second detection units 250*a* and 250*b*, respectively, that are operated with a power source dedicated to the sheet feed devices. The first detection unit 200 and the second detection units 250*a* and 250*b* are connected to each other via a communication line 210. In the sheet feed device 150*a*, a detection switch unit 252*a* is connected to the second detection unit 250*a*. Similarly, in the sheet feed device 150*b*, detection switch units 252*b* and 252*c* are connected to the second detection unit 250*b*. As an example of control, a controller of the image forming apparatus 100 is used for the first detection unit 200, and controllers of the sheet feed devices are used for the second detection units 250*a* and 250*b*. As the detection switch units 252*a*, 252*b*, and 252*c*, a plurality of switches that are turned on/off in conjunction with the paper stack cassettes are used. The controllers of the sheet feed devices detect the paper size and the open/closed state of the paper stack cassettes, and the information is conveyed to the controller of the image forming apparatus via the communication line 210.

However, to detect the open/closed states of the paper stack cassettes by the aforementioned conventional method, the controllers that serve as the second detection units of the sheet feed devices need to be operated. Therefore, the controllers of the sheet feed devices cannot be turned off even during the energy saving mode, and a problem arises in that power consumption for the controllers of the sheet feed devices increases.

On the other hand, to detect the open/closed states of the paper stack cassettes without operating the controllers of the sheet feed devices during the energy saving mode, a configuration shown in FIG. 11, for example, needs to be employed. In FIG. 11, in addition to the configuration of FIG. 10, the detection switch units 252*a*, 252*b*, and 252*c* are directly connected to the first detection unit 200 of the image forming apparatus 100 through signal lines. During the energy saving mode, it is possible to notify the first detection unit 200 of information regarding the detection switch units 252*a*, 252*b*, and 252*c* with these signal lines, rather than via the second detection units and the communication line 210. FIG. 11 shows the case where each detection switch unit has two switches, and in this case, the number of signal lines increases by six. However, the number of switches may be selected as appropriate in accordance with paper type, model, or the like, and in that case, the number of signal lines increases by the number obtained by multiplying the number of detection switches by the number of the sheet feed devices. Consequently, a problem arises in that costs rise due to an increase in signal lines or the like to detect the open/closed states of the paper stack cassettes by suppressing the above-mentioned increase in power consumption during the energy saving mode.

SUMMARY OF THE INVENTION

The invention of the present application was made in view of the foregoing problems, and provides an inexpensive mechanism for detecting an open/closed state of a paper stack cassette by suppressing power consumption during an energy saving mode and also by suppressing an increase in the number of detection signal lines.

According to one aspect of the present invention, there is provided a sheet feed device connected to an image forming apparatus having a first detection unit for detecting a change of state of the sheet feed device, comprising: a detection switch unit whose state is switched due to the change of state of the sheet feed device; a second detection unit configured to detect a state of the detection switch unit; a signal conversion unit configured to convert a detection signal obtained in accordance with a state of the detection switch into a serial signal; a communication line configured to connect the first detection unit to the second detection unit; and a signal line configured to connect the first detection unit to the signal conversion unit, wherein when the sheet feed device is in a first state, the first detection unit receives information indicating the state detected by the second detection unit via the communication line, and thereby detects the change of state of the sheet feed device, and when the sheet feed device is in a second state, the first detection unit receives the serial signal converted by the signal conversion unit via the signal line, and thereby detects the change of state of the sheet feed device.

According to the invention of the present application, the open/closed state of the paper stack cassette in the sheet feed device is also detected during the energy saving mode so as to be able to return to a standby state, resulting in improvement of usability. Furthermore, an inexpensive configuration can be established by suppressing power consumption during the energy saving mode and also by suppressing an increase in the number of signal lines between the image forming apparatus and the sheet feed device.

Further features of the present invention will become apparent from the following description of exemplary embodiments with reference to the attached drawings.

BRIEF DESCRIPTION OF THE DRAWINGS

FIG. 6 is a diagram illustrating a state of each detection switch and a paper stack cassette.

DESCRIPTION OF THE EMBODIMENTS

First Embodiment

Overall Apparatus Configuration

Figure 1:
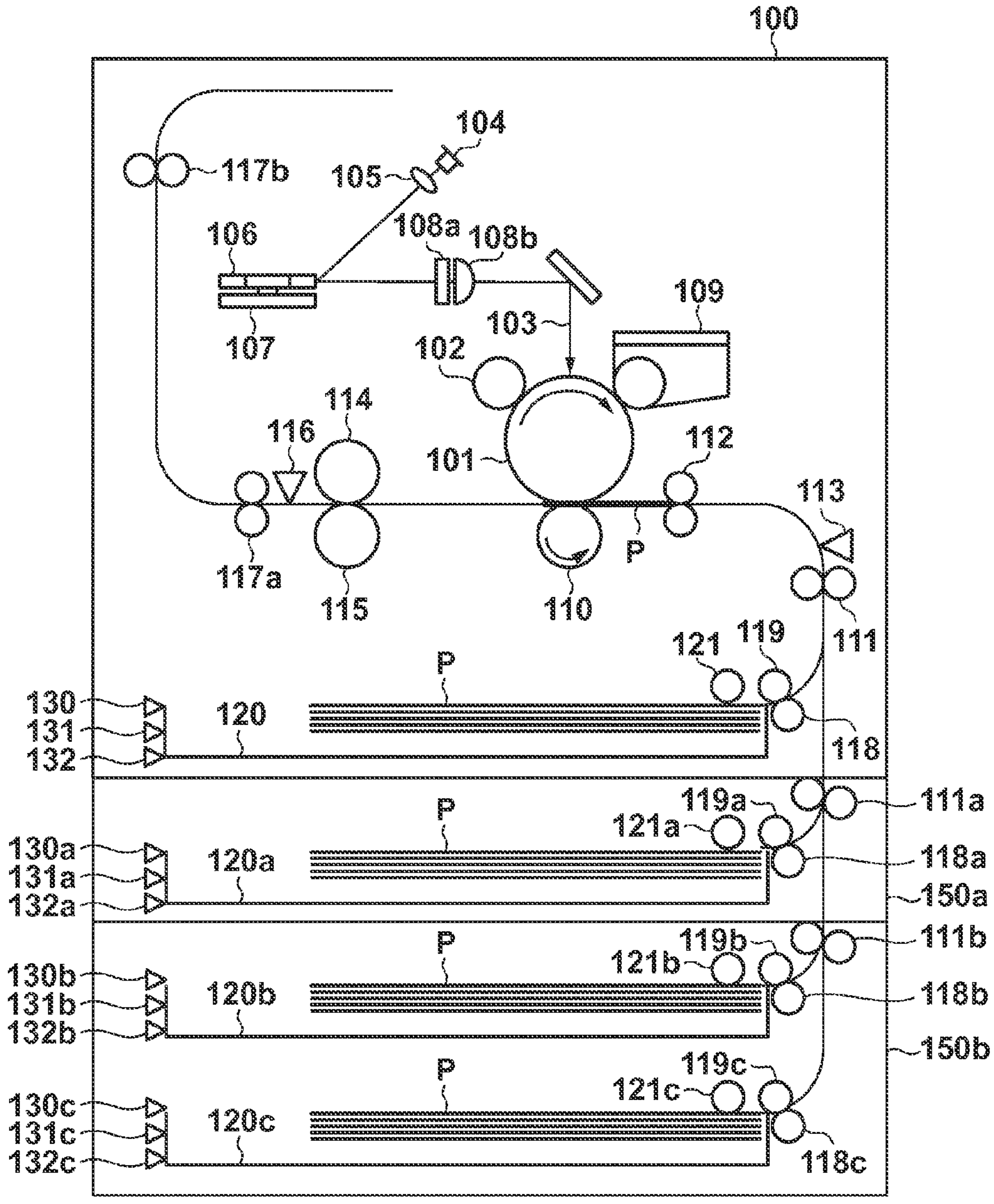
FIG. 1 is a schematic diagram of an image forming apparatus and sheet feed devices.

FIG. 1 is a schematic configuration diagram showing an exemplary configuration of an image forming apparatus and sheet feed devices according to the present embodiment. The image forming apparatus 100 is an electrophotographic printer. A photosensitive drum 101 is an electrostatic latent image carrier. The rotation direction of the photosensitive drum 101 is indicated by an arrow. On the upstream side of the photosensitive drum 101 in the rotation direction thereof, a charging roller 102 that uniformly charges the surface of the photosensitive drum 101 is provided so as to abut the surface thereof. A light beam 103 is irradiated by a light-emitting unit onto the charged surface on the downstream side of the position at which the charging roller 102 abuts in the rotation direction of the photosensitive drum 101. This light-emitting unit is constituted by a semiconductor laser 104 for irradiating the light beam 103 and a collimator lens 105 that deflects the semiconductor laser 104 into parallel light.

Also, the light-emitting unit is constituted by a polygon mirror 106, an optical lens 108*a*, and a cylindrical lens 108*b*. The polygon mirror 106 reflects the light beam 103 irradiated by the semiconductor laser 104, and scans the light beam 103 over the surface of the photosensitive drum 101. The optical lens 108*a* adjusts the light beam 103 to form a spot on the surface of the photosensitive drum 101. The cylindrical lens 108*b* forms the parallel light into an image on the photosensitive drum 101 in a substantially linear manner. The polygon mirror 106 is controlled by a scanner motor 107 so as to rotate at a constant speed. Further, the semiconductor laser 104 radiates the light beam 103 in accordance with image data, thereby forming an electrostatic latent image on the surface of the photosensitive drum 101. The formed electrostatic latent image is transferred onto a recording material P, which is a transfer material, by a transfer roller 110 that is installed so as to abut the photosensitive drum 101 further on the downstream side of the position onto which the light beam 103 is irradiated in the rotation direction of the photosensitive drum 101. Here, the portion where the photosensitive drum 101 and the transfer roller 110 abut each other is referred to as a transfer portion. The rotation direction of the transfer roller 110 is indicated by an arrow.

The recording materials P are contained in a paper stack cassette 120 within an apparatus body feed unit disposed on the upstream side of the photosensitive drum 101 in a sheet conveyance direction. Also, in the image forming apparatus 100, it is also possible to manually feed paper (sheet) from a multi-tray (not shown). A feed roller 121 is installed at an end of the paper stack cassette 120, and reciprocates up and down while rotating to pick up the recording materials P. Then, only the uppermost sheet of the recording materials P in the paper stack cassette 120 is sent to a conveyance path by a feed roller 119 and a retard roller 118. On the conveyance path between a paper feed roller 111 and the transfer roller 110, a pair of registration rollers 112 are installed for correcting skew of the recording material P and synchronizing image formation on the photosensitive drum 101 with conveyance of the recording material P. These registration rollers 112 send the recording material P at a predetermined timing to the aforementioned transfer position. Note that a registration paper detection sensor 113 is installed between the registration rollers 112 and the paper feed roller 111, and detects the presence of the recording material P.

The recording material P on which an unfixed toner image has been transferred by the transfer roller 110 is conveyed to a fixing device located further on the downstream side of the photosensitive drum 101 in the conveyance direction. The fixing device is constituted by a fixing roller 114 having a fixing heater therewithin and a pressure roller 115 installed so as to be pressed against the fixing roller 114. Here, a portion where the pressure roller 115 is pressed against the fixing roller 114 is referred to as a pressure portion. By heating and pressing against the recording material P conveyed from the transfer portion, the unfixed toner image on the recording material P is fixed thereon. A discharged paper detection sensor 116 for confirming conveyance of the recording material P is installed on the downstream side of the pressure portion in the conveyance direction, and detects the presence of the recording material P on which the toner image has been fixed. Paper discharge rollers 117*a* and 117*b* for discharging the recording material P are installed further on the downstream side of the discharged paper detection sensor 116 in the conveyance direction, and discharge the recording material P on which the toner image has been fixed.

Next, the sheet feed devices 150*a* and 150*b* are sheet feed devices that are optionally attachable to and detachable from a feed portion in the image forming apparatus 100. Within the optional sheet feed devices 150*a* and 150*b*, the recording materials P are contained in paper stack cassettes 120*a*, 120*b*, and 120*c*. First, it is assumed that the paper stack cassette 120*a* in the sheet feed device 150*a* is designated as a feed location in image formation processing. In this case, upon a print signal, which is a print instruction, being transmitted from a host computer (not shown) to the image forming apparatus 100, a paper feed roller 121*a* reciprocates up and down while rotating to pick up the recording materials P. Then, only one of the recording materials P that have been picked up is separated by a feed roller 119*a* and a retard roller 118*a*, and this recording material P is sent to the image forming apparatus 100 by a paper feed roller 111*a*. The sent recording material P has a predetermined image printed thereon with the aforementioned image forming operation, and is then discharged. Note that also in the case where the paper stack cassette 120*b* or 120*c* in the sheet feed device 150*b* is designated as the feed location, a paper feed roller 121*b* or 121*c*, a feed roller 119*b* or 119*c*, a retard roller 118*b* or 118*c*, and a paper feed roller 111*b* perform the same operations. Then, the sheet feed device 150*b* conveys the recording material P to the sheet feed device 150*a* that is connected at an upper stage, and further, the recording material P is conveyed to the image forming apparatus 100 via the paper feed roller 111*a*.

The feed unit within the image forming apparatus body and the sheet feed devices 150*a* and 150*b* that are optionally connected to the image forming apparatus have various detection switches. With these detection switches, the paper size of the recording materials P in the paper stack cassettes 120, 120*a*, 120*b*, and 120*c*, and an open state of the paper stack cassettes can be detected. The paper stack cassette 120 in the feed unit within the apparatus body is provided with detection switches 130, 131, and 132. The paper stack cassette 120*a* in the sheet feed device 150*a* is provided with detection switches 130*a*, 131*a*, and 132*a*. Also, in the paper stack cassettes 120*b* and 120*c* in the sheet feed device 150*b*, detection switches 130*b*, 131*b*, and 132*b* and detection switches 130*c*, 131*c*, and 132*c* are configured, respectively.

For example, the detection switches 130*a*, 131*a*, and 132*a* are configured so that on and off states thereof are switched in accordance with the paper size of the recording materials P in the paper stack cassette 120*a*, and with the open/closed state of the paper stack cassette. FIG. 6 shows a table in which exemplary correspondence of the detection results is summarized. In the table of FIG. 6, an on state of a detection switch is indicated by "1", and the off state of a detection switch is indicated by "0". With FIG. 6, seven paper sizes of the recording materials P can be identified, and a change of state due to opening/closing of the paper stack cassette 120*a* can be detected. Note that also in the paper stack cassette 120 in the feed unit within the image forming apparatus body and the paper stack cassettes 120*b* and 120*c* in the sheet feed device 150*b*, the paper size of the recording materials P and the open/closed states of the paper stack cassettes can be detected by the same method as in the paper stack cassette 120*a*.

Further, although the paper sizes of the recording materials P shown in FIG. 6 are targeted for detection in the present embodiment, the paper size types are not limited thereto, and may be selected as appropriate in accordance with use, model, or the like. Also, the number of the paper sizes of the recording materials P to be detected need only be two or more. In this case, assuming that the number of the detection switches is N, $2^N$ states, including "open", of each paper stack cassette can be detected. Also, regardless of the number of the detection switches, all detection switches are "0" when the paper stack cassette is "open". Further, although an example in which three detection switches are provided for each paper stack cassette is given in the present embodiment, the number of the detection switches is not limited thereto, and may be changed in accordance with use or functions.

Control System Configuration

Figure 2:
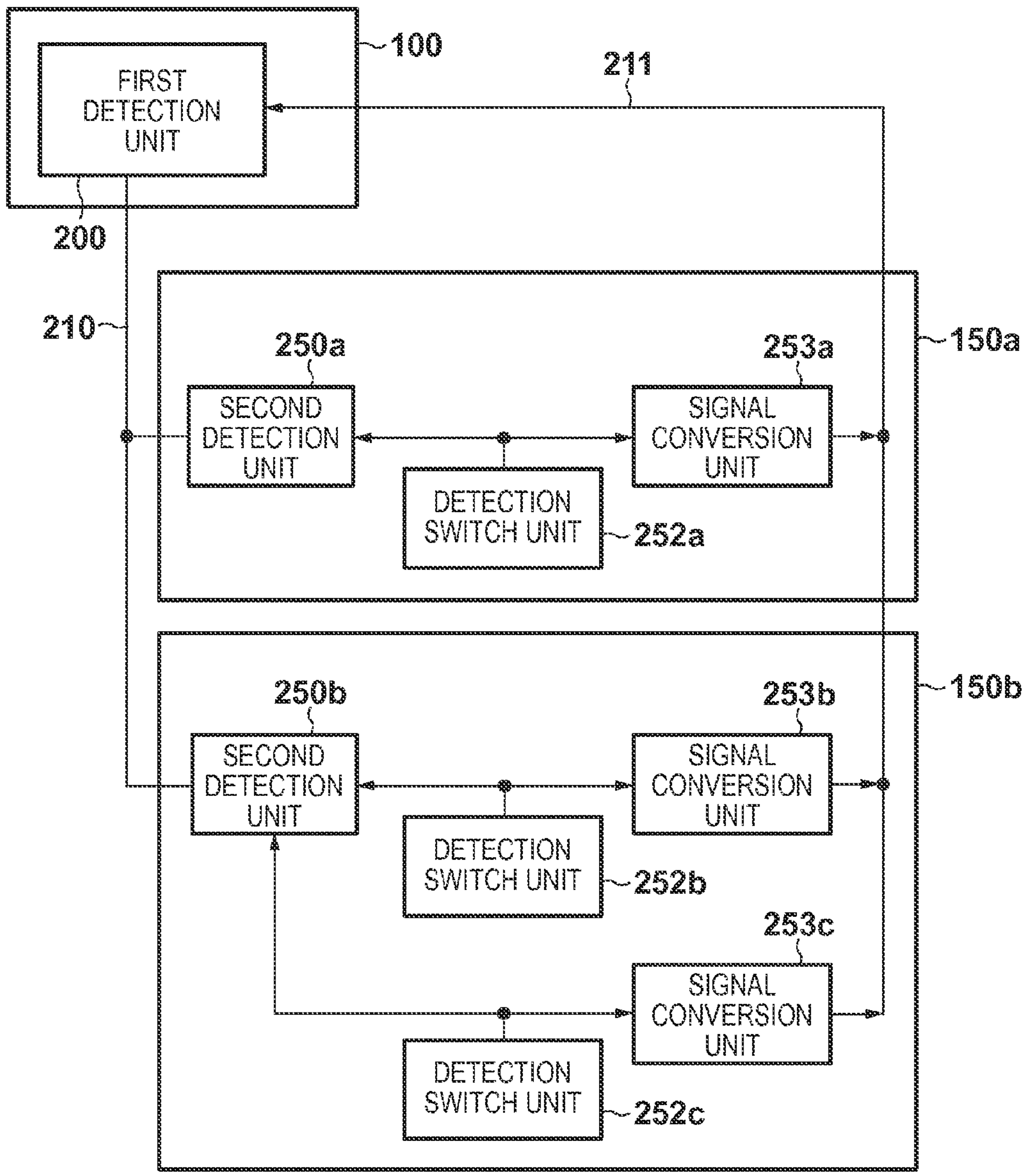
FIG. 2 a diagram showing control system blocks of the image forming apparatus and the sheet feed devices.

FIG. 2 is a diagram showing control system blocks of the image forming apparatus 100 and the sheet feed devices 150*a* and 150*b* according to the present embodiment. The sheet feed device 150*a* is provided with a detection switch unit 252*a*. The sheet feed device 150*b* is provided with detection switch units 252*b* and 252*c*. The detection switch unit 252*a* is connected to a second detection unit 250*a* (second detection unit) that operates with a power source (not shown) for the sheet feed device 150*a* and to a signal conversion unit 253*a*. Similarly, the detection switch units 252*b* and 252*c* are connected to a second detection unit 250*b* that operates with a power source (not shown) for the sheet feed device 150*b* and respectively to signal conversion units 253*b* and 253*c*. Note that the power source (not shown) for the sheet feed device 150*a* and the power source (not shown) for the sheet feed device 150*b* may be physically the same power source. Also, the signal conversion units 253*a*, 253*b*, and 253*c* are assumed to be connected to a power source on the image forming apparatus 100 body side via a signal line 211. The details of this configuration will be described using FIG. 3.

The image forming apparatus 100 has a first detection unit 200 (first detection unit). The first detection unit 200 is connected to the second detection units 250*a* and 250*b* through a communication line 210, and to the signal conversion units 253*a*, 253*b*, and 253*c* through the signal line 211. Note that the communication line 210 is a communication line for transmitting and receiving signals detected at the second detection units 250*a* and 250*b*, and is used when the second detection units are in an energized state. The configuration of the communication line is not particularly limited, and a configuration described in cited literature 1 can be used, for example. The signal line 211 is, for example, a signal line for electric signals that connects the signal conversion units to the first detection unit.

Here, a description will be given of an operation to detect the paper size of the recording materials in the sheet feed device 150*a* and the open/closed state of the paper stack cassette in the configuration of FIG. 2. The sheet feed device 150*a* is in an energized state (first state) when in standby and at the time of printing, detects a detection signal of the detection switch unit 252*a* at the second detection unit 250*a*, and determines the paper size of the recording materials and the open/closed state of the paper stack cassette. The example of the detection results is as shown in FIG. 6, which is mentioned above. The second detection unit 250*a* notifies the first detection unit 200 of the determination result by data communication via the communication line 210. Then, the image forming apparatus 100 identifies the paper size of the recording materials in the sheet feed device 150*a* and the open/closed state of the paper stack cassette, based on the received data.

Next, an energy saving state (energy saving mode) in which power consumption is reduced, such as at the time of sleep, will be described. In the energy saving state, the sheet feed device 150*a* is in an unenergized state (second state) to reduce excessive power consumption. Therefore, the second detection unit 250*a* does not operate, and communication between the first detection unit 200 and the second detection unit 250*a* through the communication line 210 is in a disconnected state. Accordingly, the sheet feed device 150*a* performs serial conversion on an electric signal detected based on a state of the detection switch unit 252*a* into a "1" serial signal by the signal conversion unit 253*a*, and thereafter notifies the first detection unit 200 of the information regarding the paper stack cassette 120*a* via the signal line 211. With this information, the image forming apparatus 100 determines the open/closed state of the paper stack cassette 120*a*.

The sheet feed device 150*b* has a configuration in which the second detection unit 250*b* detects the two paper stack cassettes 120*b* and 120*c*, and the paper stack cassette determination operation is the same as that of the sheet feed device 150*a*. Further, although in the mode of FIG. 2 an example is given in which the total number of paper stack cassettes is three, the present configuration can be applied regardless of the total number of paper stack cassettes.

Figure 3:
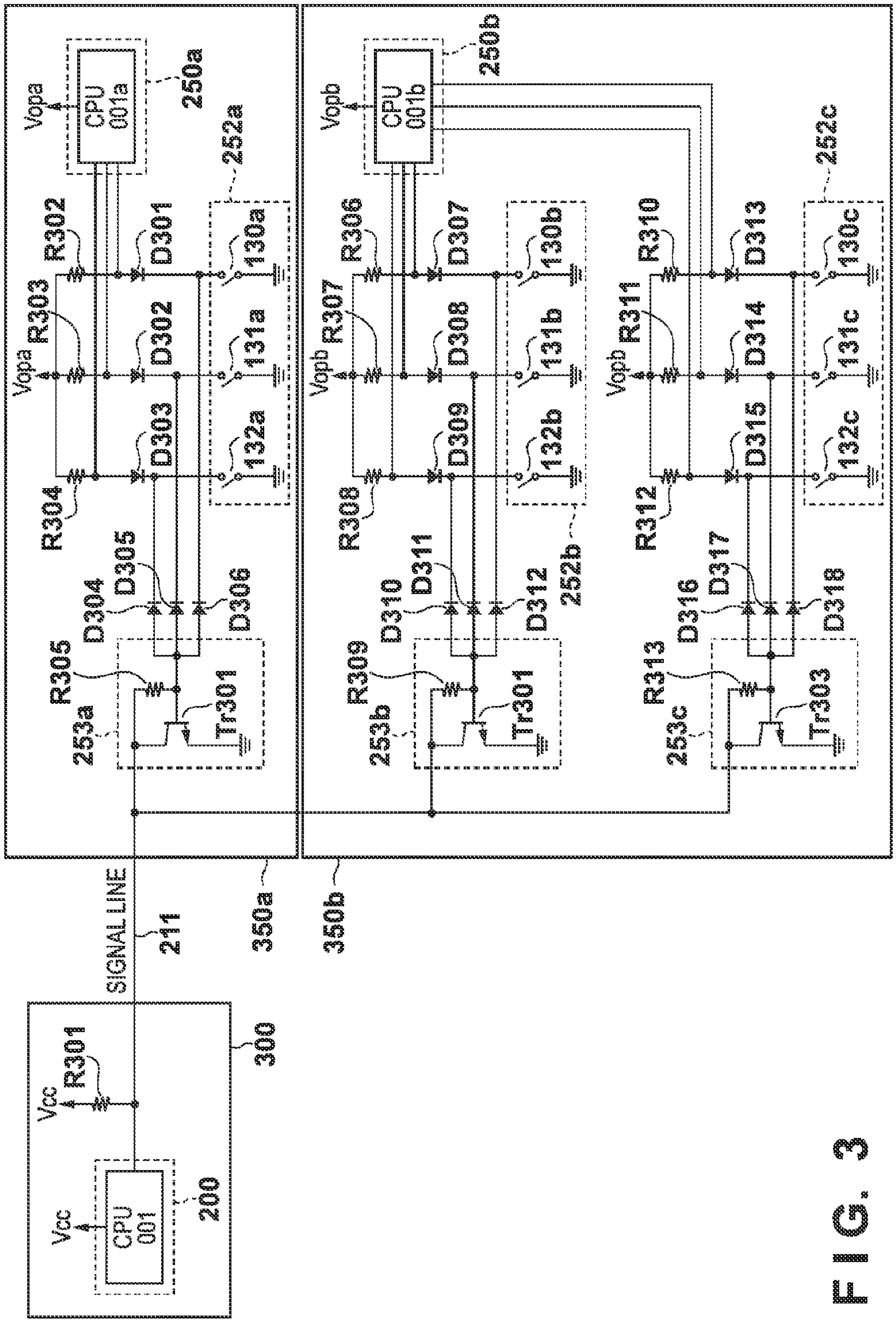
FIG. 3 is a diagram illustrating a circuit of an image forming apparatus and sheet feed devices according to a first embodiment.

FIG. 3 is an example for implementing the configuration of FIG. 2 according to the present embodiment, and shows an image forming apparatus 300 and a plurality of sheet feed devices that are detachable from the image forming apparatus 300. Here, two sheet feed devices 350*a* and 350*b* are shown.

A sheet feed device 350*a* includes, as the second detection unit 250*a*, a CPU 001*a* that is a controller of the sheet feed device 350*a* which operates with a power source Vopa for the sheet feed device. The CPU 001*a* receives detection signals from detection switches 130*a*, 131*a*, and 132*a* that correspond to the detection switch unit 252*a*. Also, although not shown in the diagram, the CPU 001*a* is connected to a CPU 001 that is a controller of the image forming apparatus 300 via the communication line 210.

Resistors R302, R303, and R304 are resistors for controlling current that runs through the detection switches 130*a*, 131*a*, and 132*a* when these detection switches are on. A transistor Tr301 in the signal conversion unit 253*a* is a transistor for receiving signals from the detection switches 130*a*, 131*a*, and 132*a*, detecting the open/closed state of the paper stack cassette, and converting information based on the detection result into a "1" signal. Note that the transistor used here may be replaced with an electronic component such as an FET.

Diodes D301, D302, and D303 are diodes for preventing voltage from going to the CPU 001*a* and Vopa when a power source Vcc in the circuit of the image forming apparatus 300 is on and the power source Vopa is off. Also, diodes D304, D305, and D306 are diodes for preventing voltage from going to the signal line that connects each detection switch to the CPU 001*a*, when the power source Vopa is on. Further, in the sheet feed device 350*b*, a CPU 001*b* has a circuit configuration for detecting two paper stack cassettes.

The circuit configurations of all paper stack cassettes are the same, and are therefore not described here. Also, although not shown in the diagram, the CPU 001*b* is connected to the CPU 001 in the image forming apparatus 300 through the communication line 210. The transistors Tr301, Tr302, and Tr303 are connected to the CPU 001 that is the controller of the image forming apparatus 300 with a single common signal line 211, and are further connected to Vcc via the resistor R301. The signal line 211 is connected to an input port of the CPU 001 in the image forming apparatus 300, and the CPU 001 detects the voltage of the signal line 211.

Here, a description will be given of a circuit operation of the sheet feed device 350*a* when in standby, at the time of printing, and when in the energy saving state. When in standby and at the time of printing, information regarding the on/off states of the detection switches 130*a*, 131*a*, and 132*a* is detected by the CPU 001*a* in the sheet feed device 350*a*. The CPU 001 receives this detection information via the aforementioned communication line 210, and the image forming apparatus 300 determines the paper size of the recording materials in the sheet feed device 350*a* and the on/off state of the paper stack cassette.

On the other hand, in the energy saving state, the transistor Tr301 receives the detection signals of the detection switches 130*a*, 131*a*, and 132*a*, converts the information regarding this detection into "1" serial signals, and thereafter transmits the serial signals to the CPU 001 in the image forming apparatus 300 through the signal line 211. Then, the CPU 001 in the image forming apparatus 300 determines the open/closed state of the paper stack cassette based on the serial signals. This detection information enables the logic of a high level and a low level of the input port of the CPU 001 in the image forming apparatus 300 to be identified by adjusting the resistance values of the resistors R301 and R305.

Figures 8, 9:
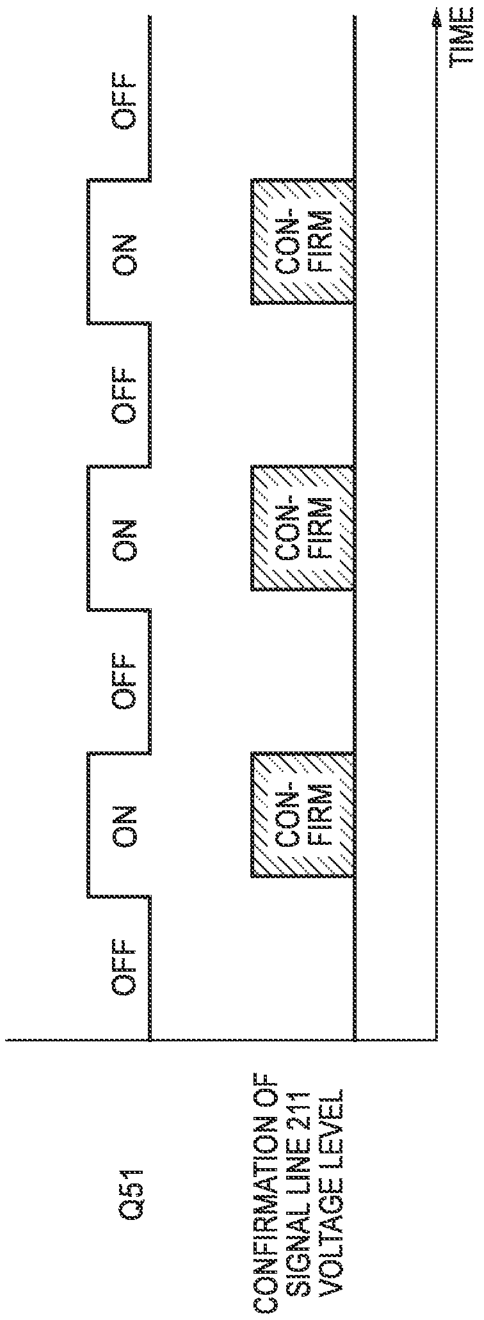
FIG. 8 is a diagram illustrating signal logic and a state of each paper stack cassette.
FIG. 9 is a diagram illustrating signal logic and detection information confirmation timing according to the third embodiment.
Figure 10:
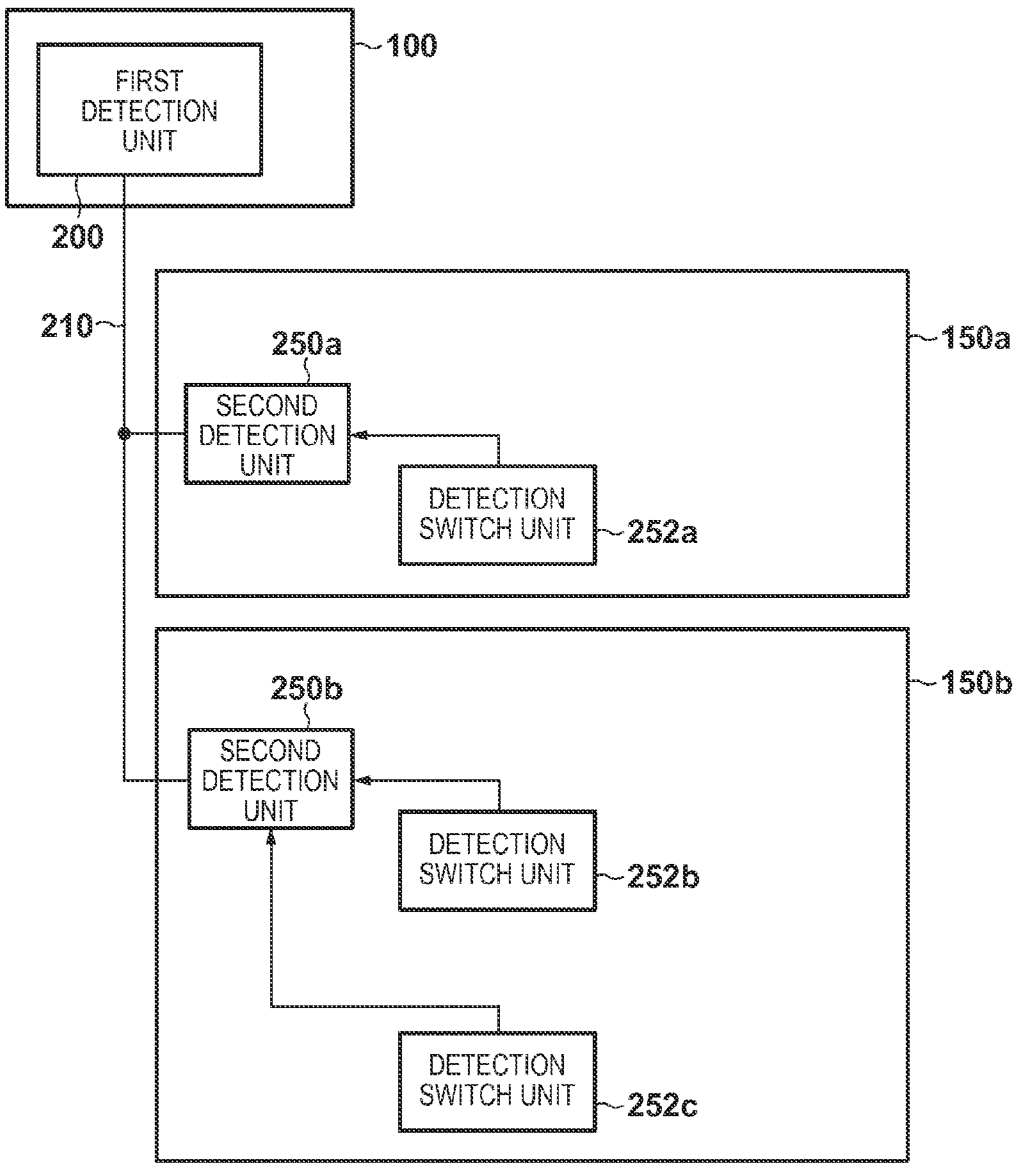
FIG. 10 is a diagram showing exemplary control system blocks of an image forming apparatus and sheet feed devices in a conventional technique.
Figure 11:
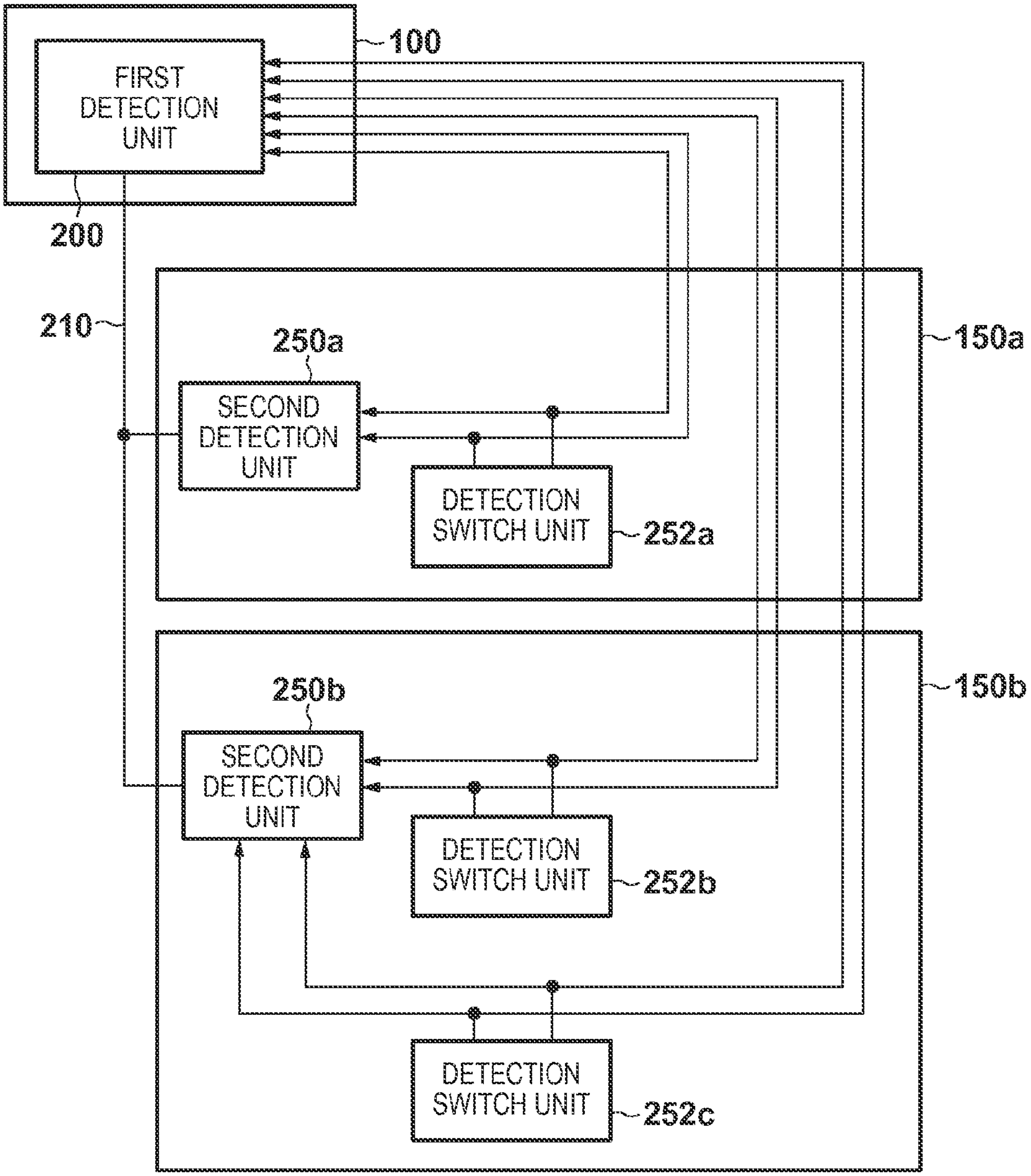
FIG. 11 a diagram showing exemplary control system blocks of an image forming apparatus and sheet feed devices in a conventional technique.

FIG. 8 shows correspondence between the open/closed state of the paper stack cassette and the voltage level of the signal line 211. When the paper stack cassette is open, all of the detection switches 130*a*, 131*a*, and 132*a* are off (0), and current runs through a base of the transistor Tr301 from Vcc via the resistors R301 and R305. At this time, the transistor Tr301 is on, and the voltage level of the signal line 211 is "Low". On the other hand, when the paper stack cassette is closed, at least one of the detection switches 130*a*, 131*a*, and 132*a* is on, the transistor Tr301 is in an off state, and the voltage level of the signal line 211 is "High". The sheet feed device 350*b* also performs the same circuit operation.

Operation Flow

Figure 7:
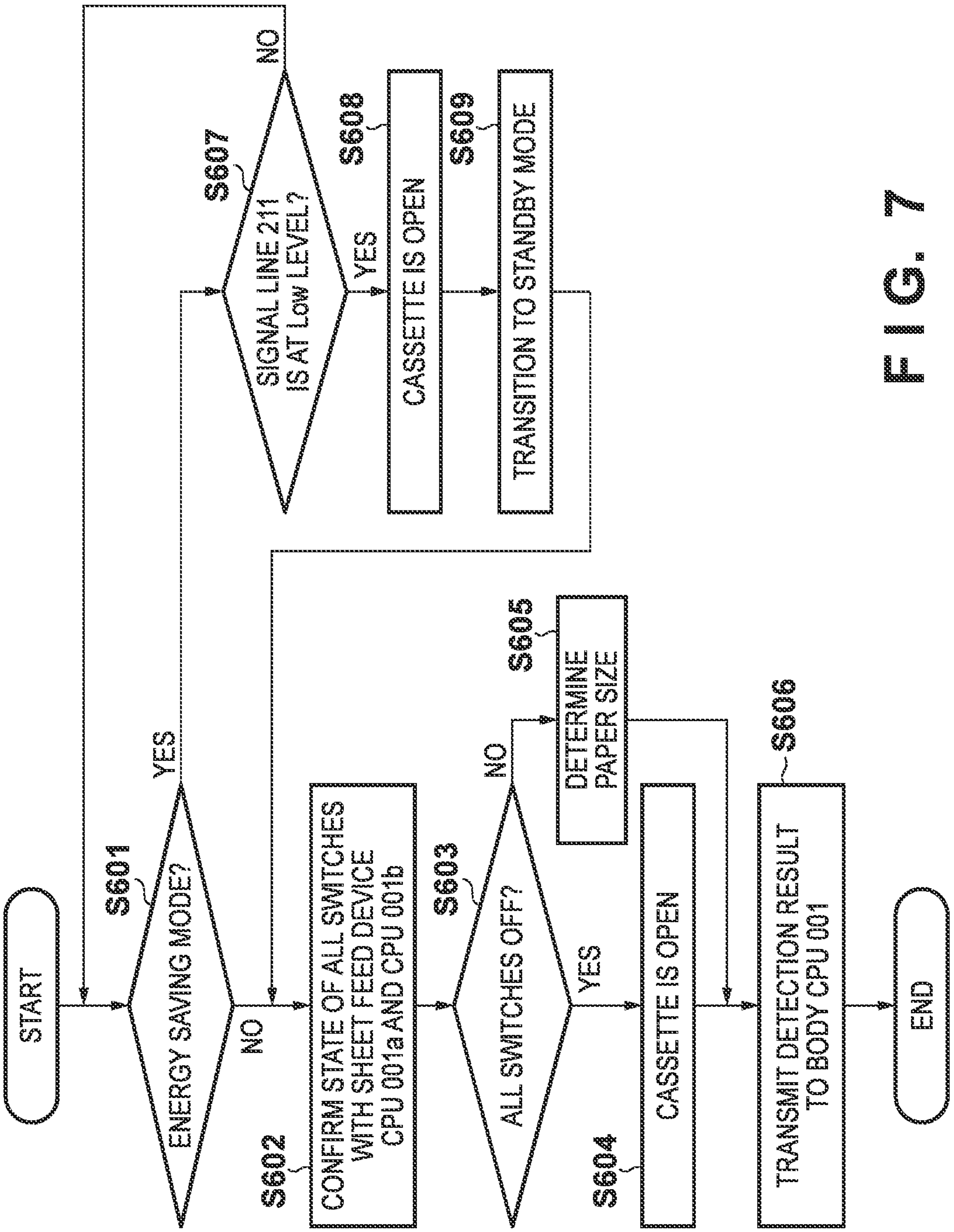
FIG. 7 is a flowchart of control for detecting a state of each paper stack cassette.

Next, a description will be given of an operation in which the image forming apparatus 300 detects the states of the paper stack cassettes in the sheet feed devices 350*a* and 350*b* according to the present embodiment, taking the flowchart of FIG. 7 as an example.

After control is started, in step S601, the image forming apparatus 300 determines whether or not the current mode is the energy saving mode. If the current mode is the energy saving mode (YES in step S601), processing proceeds to step S607. If not (NO in step S601), processing proceeds to step S602. In step S602, the image forming apparatus 300 confirms all of the states of the detection switches obtained by the CPU 001*a* in the sheet feed device 350*a* and the CPU 001*b* in the sheet feed device 350*b*, via the communication line 210. Then, in step S603, the image forming apparatus 300 determines whether or not all of the detection switches are "off". If all of the detection switches are "off" (YES in step S603), in step S604, the image forming apparatus 300 determines that the cassettes are in an open state. On the other hand, if any of the detection switches is "on" (NO in step S603), in step S605, the image forming apparatus 300 determines the paper size corresponding to the states of the detection switches, as shown in FIG. 6.

In step S606, the image forming apparatus 300 transmits the determination result in either step S604 or S605 to the CPU 001 in the image forming apparatus 300 via the signal line 211. Thereafter, the CPU 001 in the image forming apparatus 300 receives the states of the paper stack cassettes in the sheet feed device 350*a* or 350*b*, and ends the state detection operation.

In the case of the energy saving mode (YES in step S601), in step S607, the CPU 001 in the image forming apparatus 300 determines whether or not the voltage level of the signal line 211 is a low level. If the voltage level is not a low level (NO in step S607), processing returns to step S601. If the signal line 211 is at a low level (YES in step S607), in step S608, the image forming apparatus 300 identifies that a paper stack cassette in either the sheet feed device 350*a* or the sheet feed device 350*b* is opened. Then, in step S609, the image forming apparatus 300 transitions from the energy saving mode to the standby mode. Thereafter, processing proceeds to step S602, and is ended after the above-described sequence.

By performing the above-described detection flow, it is possible to monitor the states of the paper stack cassettes in the sheet feed devices 350*a* and 350*b* even in the energy saving state. Note that, as shown in the above processing flow, the image forming apparatus can detect only the open/closed states of the cassettes during the energy saving mode (i.e., detection by the signal conversion units) in the present embodiment. On the contrary, when in standby and at the time of printing (i.e., detection by the second detection units), the image forming apparatus can detect the open/closed states of the cassettes and the paper sizes.

As described above, in the present embodiment, a plurality of detection switches are used that perform conventional detection of the paper sizes of recording materials and detection of the open/closed states of the paper stack cassettes, without needing to provide the sheet feed devices with any detection switch dedicated to detection of the open/closed states of the cassettes. Then, even after the sheet feed device power sources are turned off, the image forming apparatus can identify the open/closed states of the paper stack cassettes in the sheet feed devices. Accordingly, it is possible to transition from the sleep state to the standby state after identifying that a paper stack cassette in the sheet feed devices is open during the energy saving mode, in a state in which power consumption is reduced. Moreover, in the present embodiment, the number of the signal lines that connect the sheet feed devices to the image forming apparatus increases by 1, which enables an inexpensive mechanism for detecting the open/closed states of the paper stack cassettes to be added.

Second Embodiment

The feature of a second embodiment is that determination can be performed to specify a paper stack cassette that is opened in the energy saving state in the first embodiment. In other words, in the first embodiment, the sheet feed device 150*b* includes two paper stack cassettes and it can be detected that a paper stack cassette is open or closed, but which paper stack cassette is opened or closed cannot be detected. In the present embodiment, it is possible to specify which paper stack cassette is opened or closed.

Figure 4:
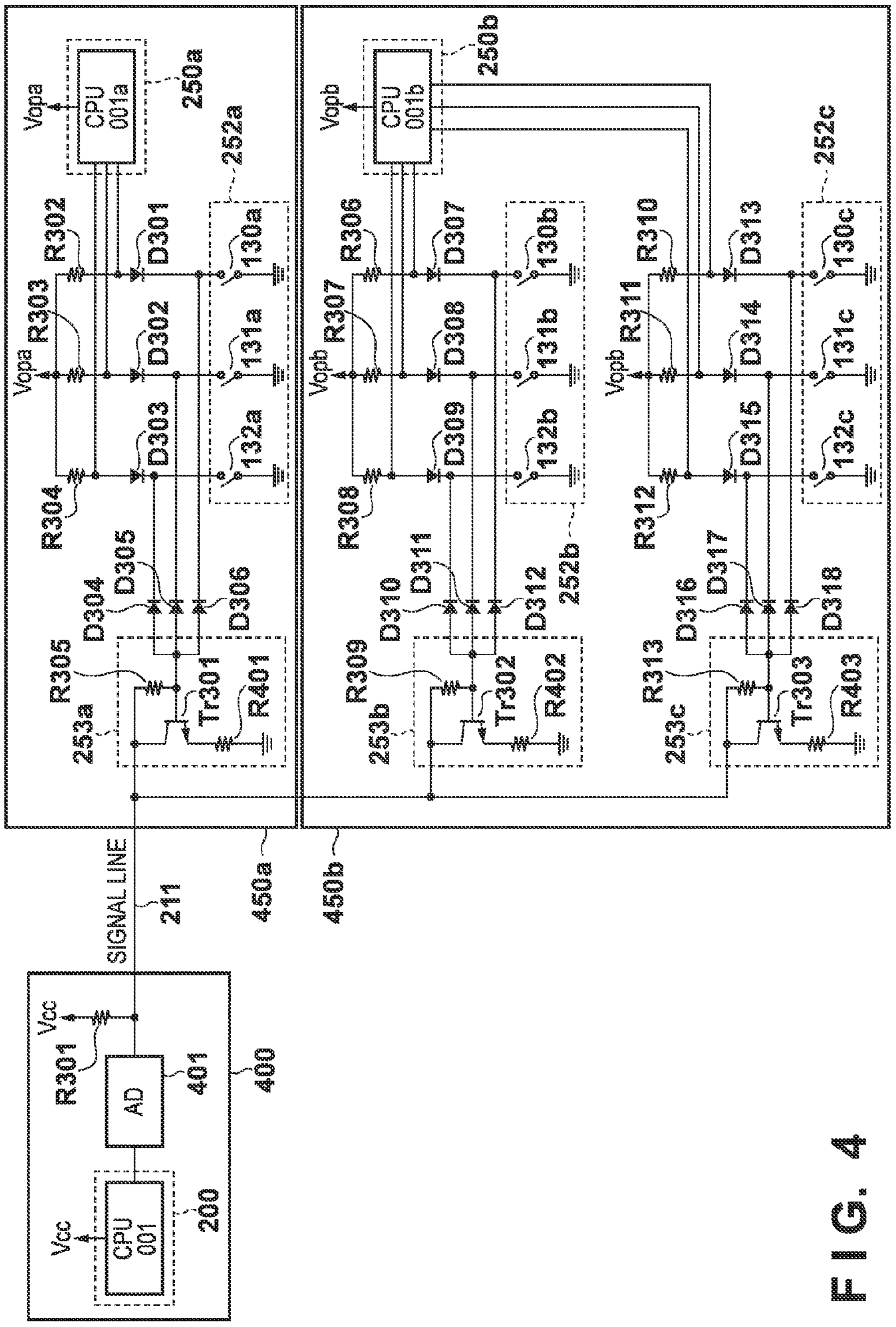
FIG. 4 is a diagram illustrating a circuit of an image forming apparatus and sheet feed devices according to a second embodiment.

FIG. 4 shows an image forming apparatus 400 and a plurality of sheet feed devices 450*a* and 450*b* that are detachable from the image forming apparatus 400 according to the present embodiment. The same configurations as those in the first embodiment are given the same reference numbers, and will not be described. Although not shown in the drawings, a CPU 001*a* and a CPU 001*b* in the sheet feed devices are connected to a CPU 001 in the image forming apparatus 400 via a communication line 210, as with the first embodiment.

In the sheet feed device 450*a*, a resistor R401 is connected between an emitter of a transistor Tr301 and GND, in addition to the circuit configuration of the first embodiment. The resistor R401 is a resistor for controlling a voltage value of a signal line 211 when the transistor Tr301 is on.

In the image forming apparatus 400, an A/D converter AD 401 is connected between the signal line 211 and the CPU 001, in addition to the circuit configuration of the first embodiment. The A/D converter AD 401 receives input of the voltage value of the signal line 211, and outputs digital data corresponding to the digital value. The CPU 001 stores in advance the digital data corresponding to a predetermined voltage value, and can read the digital data transmitted from the A/D converter AD 401 and determine the state of the signal line. Note that the determination circuit uses a general-purpose CPU and A/D converter in the present embodiment, but a single-chip microcomputer that has an embedded A/D converter may alternatively be used.

Here, the sheet feed device 450*a* includes a paper stack cassette 120*a* corresponding to the on/off states of detection switches 130*a*, 131*a*, and 132*a*, as with the sheet feed device 150*a* of FIG. 1. The sheet feed device 450*b* has a paper stack cassette 120*b* corresponding to detection switches 130*b*, 131*b*, and 132*b*, and a paper stack cassette 120*c* corresponding to detection switches 130*c*, 131*c*, and 132*c*, as with the sheet feed device 150*b* of FIG. 1. In other words, when the paper stack cassette 120*a* is opened, the transistor Tr301 is turned on, and the voltage value of the signal line 211 is determined. The voltage value of the signal line 211 at this time is assumed to be V1. Similarly, the voltage value of the signal line 211 when the paper stack cassette 120*b* is opened is assumed to be V2, and the voltage value of the signal line 211 when the paper stack cassette 120*c* is open is assumed to be V3.

Voltages V1, V2, and V3 can be controlled with resistance values of resistors R401, R402, and R403, respectively, and the voltages V1, V2, and V3 take different values resulting from the resistance values of the resistors R401, R402, and R403 being varied. At this time, digital data associated with the voltages V1, V2, and V3, and the voltage values when all of the cassettes are closed is held in advance by the CPU 001. By confirming digital data supplied from the A/D converter AD 401 and the digital data that is held in advance, the image forming apparatus 400 can determine which paper stack cassette is open, or if all of the paper stack cassettes are closed.

Note that although the present embodiment has been described, taking an example in which the number of the paper stack cassettes in each sheet feed device is three, the present configuration can be applied regardless of the total number of the paper stack cassettes.

Third Embodiment

The feature of a third embodiment is that the open/closed states of the paper stack cassettes can be determined while reducing power consumption during the energy saving mode, compared with the first embodiment.

Figure 5:
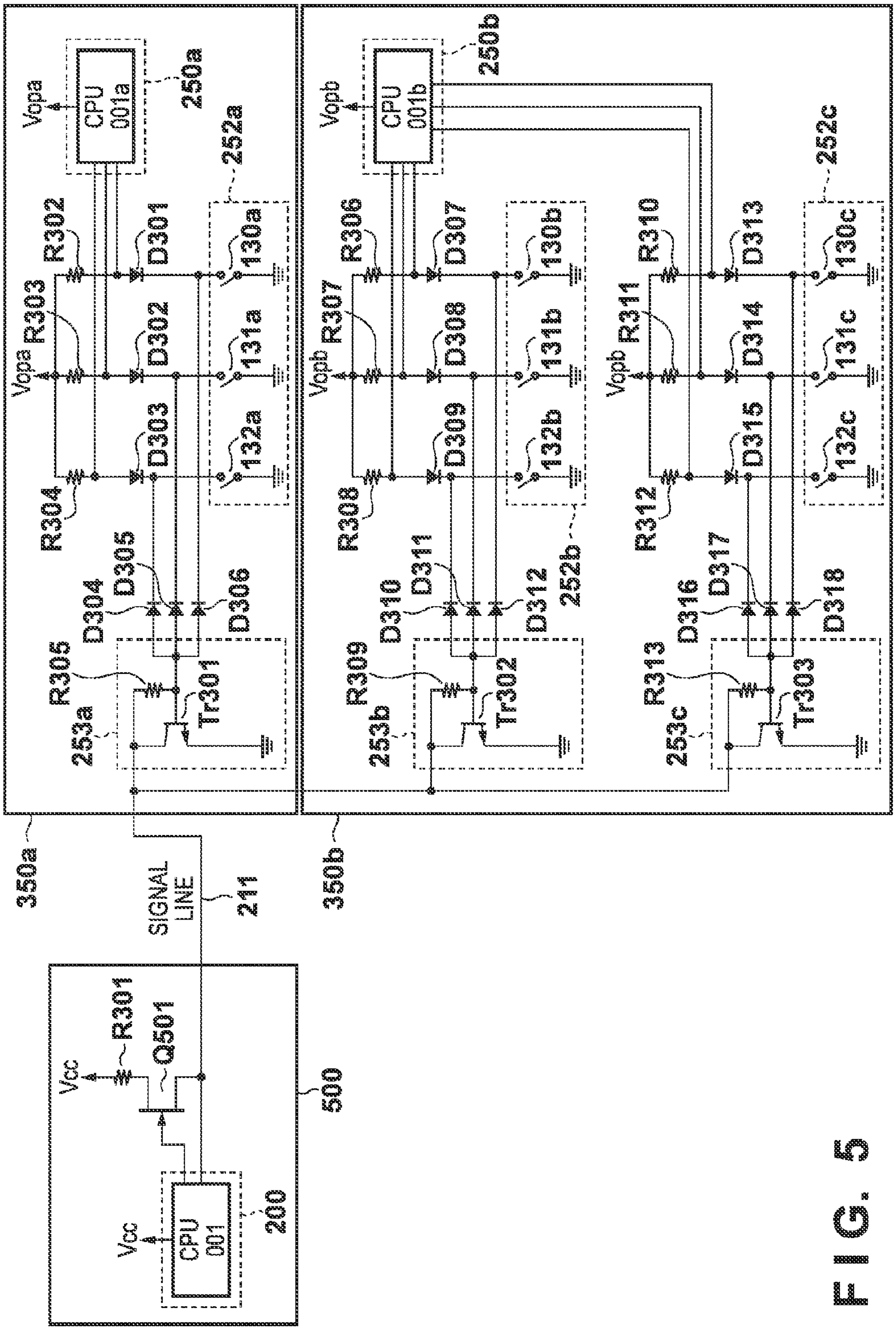
FIG. 5 is a diagram illustrating a circuit of an image forming apparatus and sheet feed devices according to a third embodiment.

FIG. 5 shows an image forming apparatus 500 and a plurality of sheet feed devices 350*a* and 350*b* that are detachable from the image forming apparatus 500 according to the present embodiment. The same configurations as those in the first embodiment are given the same reference numbers, and will not be described. Although not shown in the drawings, a CPU 001*a* and a CPU 001*b* in the sheet feed devices are connected to a CPU 001 in the image forming apparatus 500 via a communication line 210, as with the first embodiment.

In the image forming apparatus 500, a signal line 211 is connected to a drain of a load switch Q501, in addition to the circuit configuration of the first embodiment. Also, a source of the load switch Q501 is pulled up to Vcc via the resistor R301, and a gate thereof is connected to an output port of the CPU 001. Note that the load switch Q501 has been described, taking an example of an FET, but it may alternatively be configured with an electronic component such as a transistor.

A circuit operation in the energy saving mode will be described. In the present embodiment, information regarding detection by the CPU 001 in the image forming apparatus 500 on the signal line 211 is confirmed in association with an on/off state of the load switch Q501. Detection information confirmation timing on the signal line 211 is shown in FIG. 9. In FIG. 9, the horizontal axis represents time. When the load switch Q501 is on, in the circuit operation, which is similar to that in the first embodiment, information regarding detection on the signal line 211 is confirmed by the CPU 001 to determine the open/closed states of the paper stack cassettes.

When the load switch Q501 is off, the information regarding detection on the signal line 211 is not confirmed. At this time, the detection switches in the sheet feed devices are disconnected from Vcc, and therefore, current does not run through the detection switches. In other words, while the load switch Q501 is off, power consumption is reduced. Also, the time during which the load switch Q501 is on/off is set to be sufficiently smaller than the time taken to open/close the paper stack cassette, so that a user cannot identify the load switch Q501 turning on/off, and usability is not impaired.

Note that although the time intervals during which the load switch Q501 is on and off are the same in FIG. 9, one of these intervals may be set longer than the other.

As described above, in the present embodiment, power consumption can be further reduced during the energy saving mode, in addition to the effect of the first embodiment. Furthermore, it is possible to determine whether each paper stack cassette is open or closed, without impairing usability.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-077803, filed Mar. 29, 2012, which is hereby incorporated by reference herein in its entirety.

What is claimed is:

1. A sheet feed device connected to an image forming apparatus having a first detection unit for detecting a change of state of the sheet feed device, comprising:

a detection switch unit whose state is switched due to the change of state of the sheet feed device;

a second detection unit configured to detect a state of the detection switch unit;

a signal conversion unit configured to convert a detection signal obtained in accordance with a state of the detection switch unit into a serial signal;

a communication line configured to connect the first detection unit to the second detection unit; and a signal line configured to connect the first detection unit to the signal conversion unit, wherein when the sheet feed device is in a first state, the first detection unit receives information indicating the state detected by the second detection unit via the communication line, and thereby detects the change of state of the sheet feed device, and when the sheet feed device is in a second state, the first detection unit receives the serial signal converted by the signal conversion unit via the signal line, and thereby detects the change of state of the sheet feed device.

2. The sheet feed device according to claim 1, wherein the sheet feed device includes at least one paper stack cassette that is attachable to and detachable from the image forming apparatus, and the state of the detection switch unit is switched in accordance with opening and closing of the paper stack cassette.

3. The sheet feed device according to claim 2, wherein the detection switch unit includes a plurality of detection switches whose on and off states are switched in accordance with the state of the sheet feed device, and the second detection unit identifies open and closed states of the paper stack cassette and a paper size of paper stacked in the paper stack cassette, based on a combination of on and off states of the plurality of detection switches.

4. The sheet feed device according to claim 1, wherein the first state is a state in which the sheet feed device is energized, and the second state is a state in which the sheet feed device is unenergized.

5. The sheet feed device according to claim 4, wherein the second detection unit is energized and operates in the first state, and is in an unenergized state and does not operate in the second state, and electric power is supplied to the signal conversion unit by a power source of the image forming apparatus in the second state.

6. The sheet feed device according to claim 2, wherein the signal conversion unit converts the detection signal into a signal of a different level for each paper stack cassette in the sheet feed device, and the first detection unit detects the change of state of each paper stack cassette in accordance with the level of the converted serial signal.

7. An image forming apparatus connected to the sheet feed device according to claim 1, comprising:

the first detection unit configured to detect the change of state of the sheet feed device, wherein the change of state of the sheet feed device is detected based on a detection result of the first detection unit.

8. The image forming apparatus according to claim 7, wherein in the second state, the first detection unit detects open and closed states of a paper stack cassette in the sheet feed device based on the serial signal received via the signal line.

9. The image forming apparatus according to claim 7, wherein the first detection unit holds information in which levels of the serial signal received from the sheet feed device via the signal line are respectively associated with paper stack cassettes in the sheet feed device, and the first detection unit specifies a paper stack cassette in the sheet feed device in which the change of state has occurred, using the information.

10. The image forming apparatus according to claim 7, wherein the first detection unit performs control for supplying electric power to the signal conversion unit in the sheet feed device when confirming the change of state of the sheet feed device.

* * * * *